United States Patent [19] [11] 4,057,657
Garnett et al. [45] Nov. 8, 1977

[54] CURABLE PRE-POLYMER COMPOSITIONS, METHOD OF MAKING AND METHOD OF COATING ARTICLES THEREWITH

[76] Inventors: John Lyndon Garnett, 29 Arabella Street, Longueville, New South Wales; John Denis Rock, 12 Kara Street, Lane Cove, New South Wales, both of Australia, 2066

[21] Appl. No.: 529,384

[22] Filed: Dec. 4, 1974

[30] Foreign Application Priority Data

Dec. 13, 1973 Australia .............................. 5977/73

[51] Int. Cl.$^2$ .............................................. B05D 3/06
[52] U.S. Cl. ........................................ 427/44; 427/54; 204/159.15; 204/159.16
[58] Field of Search ............... 427/54, 44; 204/159.15, 204/159.16

[56] References Cited

U.S. PATENT DOCUMENTS

| 2,367,660 | 1/1945 | Agre | 427/54 |
| 2,413,973 | 1/1947 | Howk et al. | 427/54 |
| 2,718,515 | 9/1955 | Thomas | 427/54 |
| 3,361,842 | 1/1968 | Applegath et al. | 427/44 |
| 3,449,294 | 6/1969 | Danhauser et al. | 427/54 |
| 3,459,691 | 8/1969 | Ostrowski et al. | 427/54 |
| 3,546,002 | 12/1970 | Radlove et al. | 427/44 |
| 3,738,924 | 6/1973 | Dotson et al. | 427/44 |
| 3,770,490 | 11/1973 | Parker | 427/54 |

*Primary Examiner*—John H. Newsome
*Attorney, Agent, or Firm*—Millen & White

[57] ABSTRACT

Prepolymers prepared by U.V. or $\gamma$ irradiation of an ethylenically unsaturated monomer or monomers until a predetermined but incomplete degree of polymerization has been achieved. Coatings formed by the U.V. or electron beam curing of such prepolymers are also comprehended.

12 Claims, No Drawings

CURABLE PRE-POLYMER COMPOSITIONS, METHOD OF MAKING AND METHOD OF COATING ARTICLES THEREWITH

BACKGROUND OF THE INVENTION

The present invention relates to the preparation of U.V. and electron beam curable compositions and to the formation of coatings from such compositions.

It is well known that many ethylenically unsaturated monomers may be polymerised upon being suitably activated. This activation may be derived from free radical initiators, by photoinitiation, by thermal initiation or by the use of U.V. or ionising radiation. These polymerisable monomers have been used as coating materials and cured in situ by one of the means referred to above. These coatings have been found to be generally unsatisfactory due to the difficulty of obtaining a complete cure of the coating. It is thought that this difficulty stems largely from the coating layer being too thin to enable a sufficiently high steady state of free radicals to be generated. A further difficulty associated with the in situ curing of the monomers referred to above is that the low viscosity of the monomer makes it difficult to form an even coating on an article and to maintain that coating until curing has taken place.

It has been proposed in U.S. Pat. Nos. 3,551,246 and 3,546,002 to form prepolymers thermally and to form U.V. curable coatings from the prepolymers. These thermally produced prepolymers have been found to be of limited use due to the dark colour generated within the prepolymer during its formation; due to the difficulty of curing the prepolymer; and due to the limited number of monomers and monomer blends which will form curable prepolymers without the precipitation of homopolymer from the mixture.

The present inventors have found that a very large number of prepolymers which are generally clear, highly viscous and water white in colour and which cure readily under U.V. radiation or an electron beam may be prepared by the use of U.V. or ionising radiation initiation.

SUMMARY OF THE INVENTION

In a process aspect, this invention relates to a process for the preparations of a prepolymer capable of being cured by ultra-violet or ionising radiation, comprising the steps of subjecting either (a) a polymerisable ethylenically unsaturated monomer, or a mixture of such monomers, or (b) a mixture of one or more such monomers and a long chain organic compound or a polymeric material to ionization radiation or, in the case of (b), to ultra-violet or ionising radiation until the monomer, or monomers, achieves a predetermined but incomplete degree of polymerisation, and removing the prepolymer so formed from the radiation. In a composition aspect, this invention relates to the prepolymers so formed.

In another aspect, this invention relates to a method of coating a substrate comprising applying to the substrate a layer of a prepolymer prepared according to the process of this invention and curing the prepolymer by subjecting it to ultra-violet or ionising radiation. In another aspect, this invention relates to a substrate having a coating thereon formed by the foregoing method according to this invention.

DETAILED DISCUSSION

Any of the very large number of known polymerisable ethylenically unsaturated monomers can be used in the formation of prepolymers according to this invention. The preferred monomers are those which include a vinyl or vinylidene group. The properties of the final coating depend in part upon the monomer or monomers used to form the prepolymer and the most preferred monomers will depend upon the intended end use of the prepolymer. For coating onto paper and cardboard, as in printing inks, where a glossy, water impervious, coating is required the preferred starting materials are styrene and vinyl chloride/ethyl acrylate and vinyl chloride/methyl acrylate blends in ratios of 3:1 to 1:1. For coating onto metals such as copper, aluminium or tin plate where a very hard scratch resistant coating is required styrene, and blends of two or more of the following, styrene, butyl acrylate, methyl methacrylate vinylidene chloride, ethyl acrylate, acrylonitrile, and vinyl acetate, generally in ratios of from 1 to 3 to 3 to 1 have been found to work well. For coating onto polypropylene and other synthetic plastics materials blends of acrylic acid and alkyl acrylate in ratios of 1 to 1 to have formed coatings highly adherent to the substrate. For the coating of the surfaces of concrete structures blends of methyl methacrylate with acrylonitrile or vinyl acetate have been found to perform will in adhering to the substrate and forming a water and acid resistant coating. For the lining of concrete sewerage pipes base coatings of blends of butyl acrylate with methyl methacrylate or vinyl acetate and ter-polymers of isoprene/styrene/acrylonotrile have proved very satisfactory and have shown an ability to flow under applied stresses such that the coating will not be ruptured by cracks in the pipe. In such applications a top coat of blends of two of methyl methacrylate, vinyl acetate, acrylonitrile and styrene will give abrasion resistance and water impermeability to the coating.

The starting material may include additionally long chain organic molecules such as natural drying oils e.g. linseed oil, shellac, cellulose acetate and natural resins e.g. gum rosin, or polymeric materials such as polyamides, polyesters including alkyd resins, polycarbonates, epoxy resins, polyvinylalcohols, polyvinyl chlorides, polysiloxanes and polysilanes either with or without solvents. These additional materials may be used with single monomers or with mixtures of monomers. Styrene/Gum resin and Styrene/alkyd resin blends have been found to be advantageous in the formation of printing inks while butyl acrylate/linseed oil prepolymers are useful in forming base coats in concrete sewerage pipes. Blends of linseed oil, alkyd resins and gum rosin with one or more of the following monomers viz. α methyl styrene, styrene and butyl acrylate have formed coatings on metal which exhibit excellent scratch resistance. Mixtures including long chain organic molecules or polymers are preferably prepolymerised using U.V. radiation.

The monomers referred to above, when used alone, in mixtures or in blends with long chain compounds or polymers are particularly preferred however the present invention is not limited to the use of these monomers. A large number of other monomers may also be used to form curable prepolymers and these include diallyl phthalate, vinyl ethyl ether, 2-hexyl ethyl acrylate, diallyl isophthalate, allyl glycidyl ether, acrylamide, alkylamine, allylacrylte, vinylpyridine, maleic anhydride, acrylic acid and divinyl benzene. These monomers may be used alone, together in mixtures or, if the prepolymer is to be cured by U.V. radiation, together with long chain molecules or polymers.

The formation of the prepolymer is brought about by U.V. or ionising radiation. U.V. and γ-radiation are particularly preferred due both to the relative ease of radiation and the good results achieved however other ionising radiation such as x rays or electron beams may be used. The selection of the source does not appear to be critical however the present inventors have found a 130 w U.V. Wotan lamp set 13 cm. from the centre of a glass reaction vessel to be satisfactory, similarly for γ radiation doses of from 0.01 to 5 M rads frm a spent fuel rod source have proven satisfactory. For any given starting material and any given source simple experimentation will be required to find the optimum duration of irradiation. The duration will also depend upon the intended end use of the prepolymer. In general the radiation will be continued until the prepolymer will have a suitable viscosity once it has cooled to ambient temperature after the irradiation. What is a suitable viscosity will largely depend upon how the prepolymer is to be coated onto the substrate and the nature of the substrate itself. If the prepolymer is to be sprayed on or if the substrate is to be dipped into the prepolymer then the prepolymer should not be unduly viscous. If the prepolymer is to be brushed, rolled or spread with a scraper onto the substrate then the prepolymer is preferably very viscous. Absorbant substrates such as wood and paper require viscous prepolymers so that the prepolymer will not be absorbed into the substrate before it can be cured. As a rough guide the present inventors used a magnetic stirrer of conventonal type to stir the monomer mixture and found that for most applications it was satisfactory to remove the prepolymer from the radiation when the viscosity of the prepolymer was such that the stirrer no longer rotated. It should be stressed that the prepolymer must be removed from the radiation while it still has a capacity for chain propogation i.e. before polymerisation has been completed.

The formation may be carried out at room temperature or may be carried out at an elevated temperature. The application of heat is possible within the limits of the boiling point of the monomer or monomers used to form the prepolymer and their tendency upon heating to form solid homopolymers rather than liquid prepolymers. Heating has been found to be particularly advantageous where the prepolymer is formed by U.V. initiation as the increased temperature allows a shorter period of U.V. initiation resulting in less colouration of the prepolymer due to oxidation. The high energies available with commercial γ ray sources render temperature effects with γ ray initiation negligible.

Additives which can be used to modify prepolymer formation and/or curing of the prepolymer, include sensitisers, solvents, chain transfer agents and inhibitors.

U.V. initiation of prepolymer formation is generally enhanced by the presence of from 1 to 20% by weight of a conventional photo-sensitizer such as benzoin ethers, uranyl nitrates, benzophenone or Michler's ketone. This photosensitiser is preferably added to the monomers before the prepolymer formation however additional photosensitiser may be added prior to the U.V. cure of the prepolymer coating. It appears to be desirable to avoid photosensitiser additions if the prepolymer is to be cured using an electron beam.

Solvents are preferably avoided in the present invention for economic and environmental reasons however for spraying some prepolymers it is desirable to dissolve the prepolymer in a compatible solvent. Solvents may also be added to maintain one phase systems with otherwise incompatible monomers.

Chain transfer agents of conventional types such as carbon tetrachloride or carbon tetrabromide may be added to the prepolymer to enhance the curing of the prepolymer under U.V. or electron beam initiation. Chain transfer agents are particularly desirable when the prepolymer is pigmented with a U.V. opaque pigment.

Conventional pigments may be added to the system either at the prepolymer formation stage or at the curing stage by conventional means. Dyes may also be added provided that they are not destroyed by the curing process.

If necessary conventional inhibitors may be added to the prepolymer to prevent change in the prepolymer during storage. Inhibitors such as methyl ethyl hydroquinone may be used in amounts of up to 2000p.p.m.

The prepolymers formed by the process according to the present invention may be applied to any suitable substrate such as paper, cardboard and other cellulosic materials such as wood, particle board and the like; metals such as copper, aluminium, tin plate and mild steel; concrete products such as building blocks, pipes and concrete buildings; synthetic plastics such as polypropylene; natural polymers such as leather; and glass.

The coating of the substrate may be achieved by dipping, spraying, brushing, rolling, spreading with a blade or by any other suitable means such as by a printing press.

The curing of the prepolymers is achieved either using U.V. or ionising radiation, the ionising radiation preferably being an electron beam. The time of cure is proportional to the incident radiation and accordingly where rapid cure is desired a high intensity source is preferred. The present inventors used a 6 inch 200 w/inch Hanovia U.V. lamp at a distance of 30 cm from the substrate to achieve curing times of from 1 to 50 minutes; subsequent use of a 36 inch lamp of 20 w/inch fitted with a reflector and at a shorter distance from the lamp showed cure times approximately 300 times faster. Electron beam irradiations of the order of 1 M rad or more were generally necessary to achieve surface or through cure of prepolymer coatings. If electron beam curing is to be used it is desirable to carry out the cure under nitrogen to avoid oxygen at the coating surface acting as a radical scavenger and reducing the rate of cure of the prepolymer.

Hereinafter given by way of example only are preferred examples of the present invention and comparative examples showing the advantages of the present invention over the prior art.

The following examples show use of prepolymers prepared by the γ radiation of the monomers listed. The prepolymers were cured on the substrates listed using a U.V. lamp of 200 watts/inch at a distance of 30 cm from the sample. The solvent nominated was used solely to enable the prepolymer to be sprayed on to the substrate using a low viscosity spray gun.

| 1. STYRENE/DIALLYL PHTHALATE (2:1) | |
|---|---|
| Solvent: | Benzene |
| Prepolymer Prep: | 2M Rad at 37,632 rad/hr produced a clear |

1. STYRENE/DIALLYL PHTHALATE (2:1)

| | |
|---|---|
| | viscous prepolymer. |
| Copper: | 1 coat, 25 min cure produced a crazed finish with excellent scratch resistance. |
| Cardboard: | 3 coats, 3 min cure/coat produced a slight gloss. |
| Polypropylene: | 1 coat, 15 min cure produced a spotty finish with good scratch resistance. |
| Solvent Resistance: | Nil |

2. STYRENE/DIALLYL ISOPHTHALATE (1:1)

| | |
|---|---|
| Solvent: | Benzene |
| Prepolymer Prepn: | 2 M Rad at 37,632 rad/hr produced a clear viscous prepolymer. |
| Copper: | 1 coat, 25 min cure produced a matt finish with excellent scratch resistance. |
| Cardboard: | 3 coats, 3 min cure/coat produced no gloss. |
| Polypropylene: | 1 coat, 25 min cure produced a spotty finish with good scratch resistance. |
| Solvent Resistance: | Nil |

3. STYRENE/VINYL ETHYL ETHER (2:1)

| | |
|---|---|
| Solvent: | Acetone |
| Prepolymer Prepn: | 2.0 M Rad at 37,632 rad/hr produced a clear slightly viscous prepolymer. |
| Copper: | 1 coat, 25 min cure produced an excellent glossy finish with very good scratch resistance. |
| Cardboard: | 1st coat, 5 min cure, 2nd coat, 10 min cure produced no gloss. |
| Polypropylene: | 1 coat, 25 min cure produced a spotty finish with excellent scratch resistance. |
| Solvent Resistance: | Nil |

4. STYRENE/VINYL ACETATE (1:1)

| | |
|---|---|
| Solvent: | Acetone |
| Prepolymer Prepn.: | 2.0 Rad at 37,632 rad/hr produced a clear slightly viscous prepolymer. |
| Copper: | 1 coat, 35 min cure produced an excellent glossy finish with very good scratch resistance. |
| Cardboard: | 2 coats, 5 min cure/coat produced a slight gloss. |
| Polypropylene: | 1 coat, 35 min cure produced a spotty finish with excellent scratch resistance. |
| Solvent Resistance: | Nil |

5. STYRENE/2-HEXYL ETHYL ACRYLATE (2:1)

| | |
|---|---|
| Solvent: | Acetone |
| Prepolymer Prepn: | 1.0 M Rad at 37,632 rad/hr produced a clear very viscous prepolymer. |
| Copper: | 1 coat, 30 min cure produced an excellent glossy finish with excellent scratch resistance. |
| Cardboard: | 3 coats, 5 min cure/coat produced no gloss. |
| Polypropylene: | 1 coat, 30 min cure produced a spotty finish with excellent scratch resistance. |
| Solvent Resistance: | Partial Resistance for coating on copper. Good Resistance for coating on polypropylene. |

6. DIALLYL PHTHALATE/DIALLYL ISOPHTHALATE (1:1)

| | |
|---|---|
| Solvent: | Acetone. |
| Prepolymer Prepn: | 2.0 M Rad at 37,632 rad/hr produced a clear slightly viscous prepolymer. |
| Copper: | 1 coat, 30 min cure produced a crazed finish with excellent scratch resistance. |
| Cardboard: | 1st coat, 5 min cure, 2nd coat 10 min cure, produced no gloss. |
| Polypropylene: | 1 coat, 20 min cure produced a spotty finish with very good scratch resistance. |
| Solvent Resistance: | Copper Coating - partial resistance. Polypropylene Coating - good resistance. |

7. DIALLYL PHTHALATE/VINYL ETHYL ETHER (1:1)

| | |
|---|---|
| Solvent: | Acetone |
| Prepolymer Prepn: | 2.0 M Rad at 37,632 rad/hr produced a yellowish clear viscous prepolymer. |
| Copper: | 1 coat, 25 min cure produced a green crazed matt finish with excellent scratch resistance. |
| Cardboard: | 1 coat, 10 min cure produced no gloss. |
| Polypropylene: | 1 coat, 25 min cure produced a spotty finish with good scratch resistance. |
| Solvent Resistance: | Copper coating - nil Polypropylene coating - nil |

8. DIALLYL PHTHALATE/2-HEXYL ETHYL ACRYLATE (2:1)

| | |
|---|---|
| Solvent: | Acetone |
| Prepolymer Prepn: | 1.0 M Rad at 37,632 rad/hr produced a clear viscous prepolymer. |
| Copper: | 1 coat 45 min cure produced a gloss & matt finish with excellent scratch resistance. |
| Cardboard: | 3 coats, 5 min cure/coat produced no gloss. |
| Polypropylene: | 1 coat, 45 min cure produced a spotty finish with poor scratch resistance. |
| Solvent Resistance: | Copper coating - partial resistance. Polypropylene coating - partial resistance. |

9. DIALLYL PHTHALATE/ALLYL GLYCIDYL ETHER (1:1)

| | |
|---|---|
| Solvent: | Acetone |
| Prepolymer Prepn: | 2.0 M Rad at 37,632 rad/hr produced a clear slightly viscous prepolymer. |
| Copper: | 1 coat 40 min cure produced a soft crazed finish. |
| Cardboard: | 3 coats, 5 min cure/coat produced no gloss. |
| Polypropylene: | 1 coat 40 min cure produced a spotty finish with good scratch resistance. |
| Solvent Resistance: | Copper Coating - nil Polyprpylene coating - partial resistance. |

10. DIALLYL ISOPHTHALATE/VINYL ETHYL ETHER (1:1)

| | |
|---|---|
| Solvent: | Acetone |
| Prepolymer Prepn: | 1.5 M Rad at 37,632 rad/hr produced a clear silghtly viscous prepolymer. |
| Copper: | 1 coat 30 min cure produced an excellent glossy finish with excellent scratch resistance. |
| Cardboard: | 2 coats, 5 min cure/coat gave no gloss. |
| Polypropylene: | 1 coat, 30 min cure produced a spotty finish with excellent scratch resistance. |
| Solvent Resistance: | Copper coating - good resistance. Polypropylene coating - good resistance. |

11. DIALLYL ISOPHTHALATE/VINYL ACETATE (2:1)

| | |
|---|---|
| Solvent: | Acetone |
| Prepolymer Prepn: | 2.0 M Rad at 37,632 rad/hr produced a clear slightly viscous prepolymer. |
| Copper: | 1st coat, 15 min cure, 2nd coat 35 min cure gave a crazed finish with very good scratch resistance. |
| Cardboard: | 2 coats, 15 min cure/coat gave no gloss. |
| Polypropylene: | 2 coats, 15 min cure/coat gave a spotty finish with excellent scratch resistance. |
| Solvent Resistance: | Copper coating - good |

-continued

11. DIALLYL ISOPHTHALATE/VINYL ACETATE (2:1)

Polypropylene coating - good

12. DIALLYL ISOPHTHALATE/2-HEXYL ETHYL ACRYLATE (2:1)

| | |
|---|---|
| Solvent: | Acetone |
| Prepolymer Prepn: | 1.0 M Rad at 37,632 rad/hr gave a clear yellow viscous prepolymer. |
| Copper: | 1 coat, 40 min cure produced a matt finish with good scratch resistance. |
| Cardboard: | 1st coat, 5 min cure, 2nd & 3rd coats, 10 min cure/coat produced a good gloss. |
| Polypropylene: | 1 coat, 40 min cure produced a spotty finish with poor scratch resistance. |
| Solvent Resistance: | Copper Coating - very good resistance. Polypropylene Coating - very good resistance. |

13. DIALLYL ISOPHTHALATE/ALLYL GLYCIDYL ETHER (1:1)

| | |
|---|---|
| Solvent: | Acetone |
| Prepolymer Prepn: | 2.0 M Rad at 37,632 rad/hr gave a clear slightly viscous prepolymer. |
| Copper: | 1 coat, 40 min cure produced a matt crazed finish which was soft. |
| Cardboard: | 3 coats, 5 min cure/coat gave no gloss. |
| Polypropylene: | 1 coat 40 min cure produced a smooth finish with good scratch resistance. |
| Solvent Resistance: | Nil |

14. VINYL ETHYL ETHER/2-HEXYL ETHYL ACRYLATE (1:1)

| | |
|---|---|
| Solvent: | Acetone |
| Prepolymer Prepn: | 1.0 M Rad at 37,632 rad/hr gave a clear viscous prepolymer. |
| Copper: | 2 coats, 10 min cure/coat gave an excellent gloss and excellent scratch resistance. |
| Cardboard: | 2 coats, 10 min cure/coat gave no gloss. |
| Polypropylene: | 2 coats, 10 min cure/coat gave a soft spotty finish. |
| Solvent Resistance: | Nil |

15. STYRENE/ALLYL GLYCIDYL ETHER (1:1)

| | |
|---|---|
| Solvent: | Acetone |
| Prepolymer Prepn: | 1.5 M Rad at 37,632 rad/hr gave a clear very viscous prepolymer. |
| Copper: | 1 coat, 15 min cure gave an excellent glossy finish with excellent scratch resistance. |
| Cardboard: | 1 coat, 5 min cure gave no gloss. |
| Polypropylene: | 1 coat, 15 min cure gave an excellent glossy finish with poor scratch resistance. |
| Solvent Resistance: | Nil |

16. ACRYLAMIDE/ACRYLIC ACID (1:1)

| | |
|---|---|
| Solvent: | Methanol |
| Prepolymer Prepn: | 1.0 M Rad at 37,632 rad/hr gave a clear slightly viscous prepolymer |
| Copper: | 2 coats, 5 min cure/coat gave a green glossy finish with very good scratch resistance. |
| Cardboard: | 2 coats, 5 min cure/coat gave no gloss |
| Polypropylene: | 2 coats, 5 min cure/coat gave a spotty finish with very good scratch resistance. |
| Solvent Resistance: | Partial resistance. |

17. ACRYLAMIDE/VINYL ETHYL ETHER (1:1)

| | |
|---|---|
| Solvent: | Methanol |
| Prepolymer Prepn: | 1.0 M Rad at 37,632 rad/hr gave a liquid and a white solid mass. |
| Copper: | 1 coat, 5 min cure gave an excellent glossy finish with excellent scratch resistance. |
| Cardboard: | Omitted. |
| Polypropylene: | 1 coat, 5 min cure gave a spotty finish with average scratch resistance. |
| Solvent Resistance: | Very good solvent resistance. |

18. ACRYLAMIDE/ALLYLAMINE (1:1:)

| | |
|---|---|
| Solvent: | Methanol |
| Prepolymer Prepn: | 2.0 M Rad at 37,632 rad/hr gave a clear slightly viscous prepolymer. |
| Copper: | 1 coat, 35 min cure produced a sticky dark brown finish. |
| Cardboard: | 1 coat, 15 min cure produced no gloss |
| Polypropylene: | 1 coat, 35 min cure produced a sticky dark brown finish. |
| Solvent Resistance: | Nil |

19. ACRYLAMIDE/ALLYLACRYLATE (1:1)

| | |
|---|---|
| Solvent: | Methanol |
| Prepolymer Prepn: | 2.0 M Rad at 37,632 rad/hr gave a liquid and white solid mass. |
| Copper: | 1 coat, 10 min cure produced a glossy finish with good scratch resistance. |
| Cardboard: | Omitted. |
| Polypropylene: | 1 coat, 10 min cure produced a smooth glossy finish with good scratch resistance. cure, gave a matt finish with excellent scratch resistance. |
| Cardboard: | 2 coats, 2 min cure/coat gave no gloss. |
| Polypropylene: | 1st coat, 2 min cure, 2nd coat, 7 min cure, produced a spotty finish with poor scratch resistance. |
| Solvent Resistance: | Nil |

23. MALEIC ANHYDRIDE/ALLYL ACRYLATE (1:1)

| | |
|---|---|
| Solvent: | Acetone |
| Prepolymer Prepn: | 1.5 M Rad at 37,255 rad/hr produced a clear extremely viscous prepolymer. |
| Copper: | 1 coat, 10 min cure produced a matt finish with excellent scratch resistance. |
| Cardboard: | 2 coats, 5 min cure per coat produced no gloss. |
| Polypropylene: | 1 coat, 10 min cure produced a spotty finish with excellent scratch resistance. |
| Solvent Resistance: | Nil |

24. ACRYLIC ACID/VINYL ACETATE (1:1)

| | |
|---|---|
| Solvent: | Acetone |
| Prepolymer Prepn: | 0.5 M Rad at 37,255 rad/hr produced a slightly viscous clear solution plus some whate precipitate. |
| Copper: | 1 coat, 10 min cure produced a gloss finish with average scratch resistance. |
| Cardboard: | 2 coats, 5 min cure/coat produced no gloss. |
| Polypropylene: | 1 coat, 10 min cure produced a spotty finish with good scratch resistance. |
| Solvent Resistance: | Good |
| Solvent Resistance: | Nil |

20. MALEIC ANHYDRIDE/ACRYLIC ACID (1:1)

| | |
|---|---|
| Solvent: | Acetone |
| Prepolymer Prepn: | 1.5 M Rad at 37,632 rad/hr gave a clear slightly viscous solution. |
| Copper: | 1 coat, 10 min cure produced a glossy finish with good scratch resistance. |

20. MALEIC ANHYDRIDE/ACRYLIC ACID (1:1)

| | |
|---|---|
| Cardboard: | Omitted |
| Polypropylene: | 1 coat, 10 min cure produced a smooth glossy finish with average scratch resistance. |
| Solvent Resistance: | Nil |

21. MALEIC ANHYDRIDE/VINYL ETHYL ETHER (1:1)

| | |
|---|---|
| Solvent: | Acetone |
| Prepolymer Prepn: | 2.0 M Rad at 37,632 rad/hr gave a slightly viscous red solution. |
| Copper: | 1st coat, 2 min cure, 2nd coat, 7 min cure, produced a matt finish with average scratch resistance. |
| Cardboard: | 1st coat, 2 min cure, 2nd coat, 3 min cure produced no gloss. |
| Polypropylene: | 1st coat, 2 min cure, 2nd coat, 7 min cure gave a spotty finish with poor scratch resistance. |
| Solvent Resistance: | Nil |

22. MALEIC ANHYDRIDE/VINYL ACETATE (1:1)

| | |
|---|---|
| Solvent: | Acetone. |
| Prepolymer Prepn: | 2.0 M Rad at 37,632 rad/hr gave a slightly viscous red solution. |
| Copper: | 1st coat, 2 min cure, 2nd coat, 7 min |

25. ACRYLIC ACID/ALLYL ACRYLATE (1:1)

| | |
|---|---|
| Solvent: | Acetone |
| Prepolymer Prepn: | 0.5 M Rad at 37,255 rad/hr produced a slightly viscous yellowish prepolymer |
| Copper: | 1 coat, 10 min cure produced an excellent gloss and excellent scratch resistance. |
| Cardboard: | 2 coats, 5 min cure/coat gave no gloss. |
| Polypropylene: | 1 coat, 10 min cure produced a spotty finish with good scratch resistance. |
| Solvent Resistance: | Excellent |

26. VINYL ETHYL ETHER/ALLYL ACRYLATE (1:1)

| | |
|---|---|
| Solvent: | Acetone |
| Prepolymer Prepn: | 1.0 M Rad at 37,255 rad/hr produced a slightly viscous clear prepolymer. |
| Copper: | 1 coat, 20 min cure produced an excellent gloss and excellent scratch resistance. |
| Cardboard: | 2 coats, 5 min cure/coat produced no gloss. |
| Polypropylene: | 1 coat, 20 min cure produced a spotty finish with average scratch resistance. |
| Solvent Resistance: | Poor |

The following examples show the use of prepolymers prepared by U.V. radiation of the monomers listed. The prepolymers were cured on the substrates listed in the manner described for the previous examples. The solvents used were solely to enable the prepolymer to be sprayed onto the substrate using a low viscosity spray gun.

27. STYRENE 13 hour irradiation produced a clear viscous prepolymer. The viscosity did not change much after an initial viscosity increase and so the preparation time is arbitrary.

| | |
|---|---|
| Solvent: | Benzene |
| Cardboard: | 2 coats, 1 min cure/coat produced a good gloss. |
| Aluminum: | 1 coat, 1 min cure produced an excellent glossy finish with excellent scratch resistance. |
| Copper: | Same as aluminum. |
| Solvent Resistance: | Poor solvent resistance for coatings on aluminium and copper, complete removal of gloss from cardboard. |

28. STYRENE/BUTYL ACRYLATE

Same method of preparation as for 27.

| | |
|---|---|
| Solvent: | Benzene |
| Cardboard: | 3 coats, 1 min cure/coat gave a glossy finish. |
| Aluminium: | 2 coats, 2 min cure/coat produced a glossy homogeneous finish with excellent scratch resistance. |
| Copper: | Same as Aluminium, except good scratch resistance |

29. STYRENE/METHYL METHACRYLATE (1:1) Clear viscous liquid
(2:1) Clear viscous liquid
(1:2) Yellowish viscous liquid
Irradiation Times
(1:1) 23 hours irradiation
(2:1) 23 hours irradiation
(1:2) 24¼ hours irradiation

| | |
|---|---|
| Solvent: | Acetone |
| Cardboard (1:1) | 2 coats, 2 min cure/coat produced a poor gloss. |
| Copper (1:1): | 1 coat, 5 min cure produced an excellent gloss with good scratch resistance. |
| Cardboard (2:1): | 3 coats, 3 min cure/coat produced a slight gloss. |
| Copper (2:1): | 1 coat, 5 min cure/coat produced an excellent gloss with good scratch resistance. |
| Cardboard (1:2): | 2 coats, 3 min cure/coat produced a slight gloss |
| Copper (1:2): | 1 coat, 5 min cure produced an excellent gloss with good scratch resistance. |
| Solvent Resistance: | Nil |

30. STYRENE/VINYLEDENE CHLORIDE (7:3) Slightly yellow viscous prepolymer
(1:1) Slightly yellow viscous prepolymer
Irradiation Times
(7:3) 28 hours irradiation
(1:1) 17 hours irradiation

| | |
|---|---|
| Solvent: | Benzene |
| Cardboard (7:3): | 3 coats, 5 min cure/coat produces a slight gloss. |
| Copper (7:3): | 1 coat, 5 min cure produced an excellent gloss with good scratch resistance. |
| Cardboard (1:1): | 2 coats, 2 min cure/coat produced a glossy finish. |
| Copper (1:1): | 1 coat, 5 min cure produced an excellent gloss with good scratch resistance. |
| Solvent Resistance: | Nil |

31. BUTYL ACRYLATE/METHYL METHACRYLATE

Mixtures of ratios 1:1, 2:1 and 1:2 produced very viscous clear one phase prepolymers.
Irradiation Times
(1:1) 2¼ hours irradiation
(2:1) 2¼ hours irradiation
(1:2) 3¼ hours irradiation

| | |
|---|---|
| Solvent: | Acetone |
| Cardboard: | 2 coats, 1 min cure/coat gave no gloss |
| Aluminium: | 1 coat, 1 min cure/coat gave a glossy homogeneous finish with excellent scratch resistance. |
| Copper: | Same as Aluminium |
| Solvent Resistance: | |
| Aluminium and Copper coatings: | Poor resistance to acetone |
| Cardboard coating: | Nil resistance. |

32. BUTYL ACRYLATE/ACRYLONITRILE
(1:1) Clear slightly green one phase prepolymer
(2:1) Clear slightly yellow one phase prepolymer
(1:2) White liquid opaque mass produced after 1¾ hours irradiation.
Irradiation Times
(1:1) 2 hours irradiation
(2:1) 2¼ hours irradiation
(1:2) 1¾ hours irradiation (see above)
Testing on Cardboard, Aluminium and Copper to be done.

33. BUTYL ACRYLATE/VINYLEDENE CHLORIDE
| | |
|---|---|
| 1:3 | Yellow clear viscous one phase prepolymer |
| 1:2 | |
| 1:1 | Yellowish slightly opaque one phase prepolymer |
| 2:1 | Yellow clear extremely viscous one phase prepolymer |

Irradiation Times
(1:3) 17 hours irradiation
(1:2)
(1:1) 9¾ hours irradiation
(2:1) 18¾ hours irradiation

| | |
|---|---|
| Solvent: | Acetone |
| Cardboard (1:1): | 1st coat 2 min cure, 2nd coat 5 min cure produced a very good gloss (with a tendency to bubble) |
| Copper (1:1): | 1 coat 4 min cure produced a patchy finish with very good gloss. |
| Cardboard (1:3): | 1st coat, 3 min cure, 2nd coat 6 min cure produced an excellent gloss. |
| Copper (1:3): | 1 coat, 5 min cure produced a glossy wrinkled finish. |
| Solvent Resistance: | Nil |

34. BUTYL ACRYLATE/VINYL ACETATE
(1:1) Slightly cloudy, slightly yellow one phase prepolymer.
(2:1) & Clear slightly yellow one phase prepolymer.
(1:2) "

Irradiation Time
(1:1) 1½ hours irradiation
(2:1) 1¾ hours irradiation
(1:2) 1¾ hours irradiation

| | |
|---|---|
| Solvent: | Acetone |
| Cardboard (1:1): | 1 coat, 5 mins cure/coat produced a poor gloss |
| Aluminium and Copper (1:1): | 1 coat, 2 min cure/coat produced a rough matt homogeneous finish with good scratch resistance. |
| Cardboard (2:1): | 2 coats, 1½ mins cure for 1st coat, 4 mins for second, produced no gloss |
| Aluminium and Copper (2:1): | 1 coat, 4 min cure/coat for Aluminium, 6 min cure/coat for Copper, produced a matt finish with average scratch resistance. |
| Cardboard (1:2): | 2 coats, 1 min for 1st coat, 2 mins for 2nd, produced a glossy finish |
| Aluminium and Copper (1:2): | 1 coat, 4 mins cure produced a matt homogeneous finish with average scratch resistance. |
| Solvent resistance: | Poor solvent resistance to acetone for coatings on Aluminium and Copper at 1:1, 2:1, and 1:2 ratios. Complete gloss removal from coardboard at 1:1, 2:1 and 1:2 ratios |

35. METHYL METHACRYLATE/VINYLEDENE CHLORIDE
Mixtures of ratios 1:1, 2:1 and 1:2 produced clear yellow viscous one phase prepolymers.
(1:1) Yellow
(2:1) Very slightly yellow
(1:2) Slighty yellow Irradiation Time
(1:1) 15 hours irradiation
(2:1) 8 hours irradiation
(1:2) 13½ hours irradiation

| | |
|---|---|
| Solvent: | Acetone |
| Cardboard (1:1): | 3 coats, 2 min cure/coat produced a glossy but speckeldy finish. |
| Aluminimum (1:1): | 1 coat, 5 mins cure/coat produced a yellow glossy homogenous coat with excellent scratch resistance |
| Copper (1:1) | Same as Aluminium |
| Cardboard (2:1) | 3 coats, 2 mins cure/coat gave a glossy but speckeldy finish |
| Aluminium (2:1): | 1 coat, 5 min cure/coat produced a smooth matt finish with no gloss, but excellent scratch resistance. |
| Copper (2:1): | Same as Aluminium |
| Cardboard (1:2): | 2 coats, 2 mins cure/coat produced a glossy speckeldy finish better than (1:1) and (2:1). |
| Aluminium (1:2): | 1 coat 4 min cure, 2nd coat, 5 min cure produced a slighly yellow speckeldy finish with excellent scratch resistance. |
| Copper (1:2): | Same as Aluminium |
| Solvent Resistance: | All ratios have poor resistance to acetone. |

36. METHYL METHACRYLATE/ACRYLONITRILE
Mixtures of ratios 1:1, 2:1 and 1:2 produced slightly yellow and opaque one phase prepolymers.

Irradiation Times
(1:1) 4½ hours irradiation
(2:1) 3¼ hours irradiation
(1:2) 3½ hours irradiation

| | |
|---|---|
| Cardboard: (1:1, 2:1, 1:2) | 1 coat, 1 min cure/coat produced no gloss. |
| Aluminium: (1:1, 2:1, 1:2) | Rough matt finish with best scratch resistance found in all experiments 1 minute cure/coat |
| Copper: (1:1), 2:1, 1:2) | Same as aluminium. |
| Solvent: | Acetone |
| Solvent resistance: | Poor solvent resistance to coatings on Aluminium and Copper. Complete removal of coatings on cardboard. |

37. METHYL METHACRYLATE/VINYL ACETATE
(1:1) produced a slightly opaque one phase system
(2:1) produced a clear one phase system
(1:2) produced a slighty yellow one phase system Irradiation Times
(1:1) 5 hours irradiation
(2:1) 3 hours irradiation
(1:2) 22 hours irradiation

| | |
|---|---|
| Solvent: | Acetone |
| Cardboard (1:1): | 1 coat, 1 minute cure/coat produced no gloss. |
| Aluminium (1:1): | Rough matt finish with good scratch resistance. |
| Copper (1:1): | Same as aluminium |
| Cardboard (2:1): | 1 coat, 1 min cure/coat produced no gloss. |
| Aluminium (2:1): | 1 coat, 1 min cure/coat produced a rough matt finish with excellent scratch resistance. |
| Copper (2:1): | Same as aluminium. |
| Cardboard (1:2): | 1 coat, 1 min cure/coat, produced a gloss finish. |
| Aluminium (1:2): | 1 coat, 1 min cure/coat produced a rough matt finish with excellent scratch resistance. |
| Copper (1:2): | Same as aluminium |
| Solvent Resistance: | Aluminium and copper coatings completely removed by acetone. Cardboard coating at (1:2) ration partially removed by acetone. Cardboard coating at (1:1), (2:1) ratios completely removed by acetone. |

38. VINYLEDENE CHLORIDE/ACRYLONITRILE
(1:1) White opaque appearances after 45 mins. irradiation, homopolymerisation evident after 3¼ hours irradiation. Discarded.
(2:1) White opaque appearance after 45 mins, almost clear at 3¼ hours irradiation.
(1:2) White opaque appearance after 30 mins irradiation, homopolymerisation evident after 4 hours irradiation. Discarded.

39. VINYLEDENE CHLORIDE/VINYL ACETATE (1:1) White opaque appearance after 45 mins irradiation, homopolymerisation evident after 6¾ hours irradiation. Discarded.
(2:1) Homopolymerisation evident after 14 hours irradiation. Discarded.
(1:2) 57 hours irradiation produces a yellow viscous prepolymer.
(1:3) Clear yellow viscous prepolymer after 23 hours irradiation.

| | |
|---|---|
| Cardboard (1:3): | 3 coats, 3 min cure/coat produced a slight gloss. |
| Copper (1:3): | 1 coat, 15 min cure produced an excellent gloss with excellent scratch resistance. |
| Solvent Resistance: | Nil |

40. ETHYL ACRYLATE/VINYLEDENE CHLORIDE (1:3) Sample allowed to stand without inhibitor in lab., and polymerised to a viscous mass in 5 days.
(1:2) Yellow clear viscous one phase prepolymer
(1:1) Yellow clear viscous one phase prepolymer
(2:1) Yellow clear viscous one phase prepolymer Irradiation Times
(1:3) See above
(1:2) 16 hours irradiation
(1:1) 12½ hours irradiation
(2:1) 14 hours irradiation

| | |
|---|---|
| Solvent: | Acetone |
| Cardboard (1:3): | 1st coat 2 min cure, 2nd coat, 3 min cure produced a speckeldy glossy finish |
| Copper (1:3): | 2 coats, 3 min cure produced a glossy speckeldy finish with very good scratch resistance. |
| Cardboard (1:2): | 1st coat, 4 min cure, 2nd coat, 10 min cure produced an excellent gloss. |
| Copper (1:2): | 1 coat, 15 min cure produced an excellent glossy finish with excellent scratch resistance. |
| Cardboard (1:1): | 1st coat, 3 min cure, 2nd coat, 6 min. cure produced an excellent gloss. |
| Copper (1:1): | 1st coat, 3 min cure produced an excellent gloss with very good scratch resistance. |
| Cardboard (3:1): | 3 coats, 5 min cure/coat produced a speckeldy gloss. |
| Copper (3:1): | 1 coat, 15 min, cure produced a speckeldy glossy finish with excellent scratch resistance. |
| Solvent Resistance: | Nil |

41. ACRYLONITRILE/VINYL ACETATE

Mixtures of (1:1), (2:1) and (1:2) all homopolymerised after 1 hour's irradiation and were discarded.

42. ACRYLONITRILE/STYRENE

Mixtures of ratios 1:1, 2:1, 1:2, 4:1 and (1:2), (2:1), slightly yellow clear viscous one phase prepolymers. The acrylonitrile/styrene (8:1) mixture homopolymerised.

Irradiation times
| (1:1) | 6 hours irradiation |
|---|---|
| (1:2) | 5½ hours irradiation |
| (2:1) | 6 hours irradiation |
| (4:1) | 5 hours irradiation |
| (6:1) | 6½ hours irradiation |

| | |
|---|---|
| Solvent: | Acetone |

Curing conditions for all mixtures:
| | |
|---|---|
| Cardboard: | 3 coats, 2 mins. cure/coat |
| Aluminium: | 2 coats, 4 mins. cure/coat |
| Copper: | 2 coats, 5 mins. cure/coat |
| Cardboard (1:1): | Slightly glossy spotty finish |
| Aluminium (1:1): | Rough matt finish with excellent scratch resistance. |
| Copper (1:1): | Same as aluminium |
| Cardboard (1:2): | Same as (1:1) |
| Aluminium (1:2): | Rough matt finish with average scratch resistance. |
| Copper (1:2): | Same as Aluminium |
| Cardboard (2:1): | Same as (1:1) |
| Aluminium and Copper (2:1): | Same as (1:2) |
| Cardboard (4:1): | Same as (1:1) |
| Aluminium (4:1): | Rough matt finish with good scratch resistance. |
| Copper (4:1): | Same as aluminium |
| Cardboard (6:1): | Same as (1:1) |
| Aluminium and Copper (6:1): | Same as (4:1) |

Prepolymer of Acrylonitrile/Styrene (8:1) was attempted but homopolymerised.

| | |
|---|---|
| Solvent Resistance: | Poor to acetone given by coatings at (1:1), (1:2), (2:1), (4:1), and (6:1) on Aluminium and Copper. Coating removed from cardboard at ratios of (1:1), (2:1), (1:2), (4:1) and (6:1). |

To all mixtures containing Linseed Oil, Alkyd Resin, or Gum Resin 1% Divinyl Benzene was added during irradiation in order to favour copolymerisation over homopolymerisation.

43. LINSEED OIL/STYRENE PREPOLYMERS (1:1) On standing at about 0° C a two phase system is evident. This consists of a yellowish liquid and a white solid. On shaking these produced a one-phase opaque white viscous mass.

(2:1)  One phase system. A yellowish opaque viscous
(1:2)  mass is produced.

Irradiation Times
1:1  24 hours, 1% Divinyl Benzene added, further 7½ hours = 31½ hours.
2:1  24 hours, 1% Divinyl Benzene added, further 7½ hours = 31½ hours
1:2  17 hours, 1% Divinyl Benzene added, further 7 hours = 24 hours.

| | |
|---|---|
| Solvent: | Acetone |
| Cardboard (1:1): | 3 coats, 3 min cure/coat produced a slight gloss. |
| Aluminium (1:1): | 1 coat, 8 mins cure produced a hard glossy homogeneous finish. |
| Copper (1:1): | Same as Aluminium, except 10 min cure |
| Cardboard (2:1): | Same as (1:1) |
| Aluminium (2:1): | Same as 1:1 except 4 min cure. |
| Copper (2:1): | Same as 1:1 except 7 min cure. |
| Cardboard (1:2): | Same as (1:1). |
| Aluminium (1:2): | Same as 1:1 except 3½ min cure. |
| Copper (1:2): | Same as 1:1 except 13½ min cure. |
| Solvent Resistance: | Poor solvent resistance to acetone by coatings on Aluminium and Copper. Acetone produces slight coating removal at (1:1), and (1:2) though complete removal occurs at (2:1) on cardboard. |

44. LINSEED OIL/STYRENE + SARTOMER MONOMERS 444 PREPOLYMERS (1:1) On standing at 0° C a two phase system is evident. This consists of a yellowish liquid and a white solid. On shaking these produced a yellow opaque one phase viscous mass. Similar to 1:1 with 1% Divinyl Benzene
(2:1) Yellow liquid with a small amount of white solid. White solid does not dissolve in the yellow liquid.
(1:2) A slightly opaque viscous liquid which is one phase.

Irradiation Times
(1:1) 1% Sartomer monomers 444 added, 30 hours irradiation
(2:1) "
(1:2) "

| | |
|---|---|
| Solvent: | Acetone for 1:1, 2:1 and 1:2 |
| Cardboard (1:1): | 3 coats, 3 mins cure/coat produced rough finish with a slight gloss. |
| Aluminium (1:1): | One coat, 15 mins cure produced an inhomogeneous rough matt finish with average scratch resistance |
| Copper (1:1): | One coat, 20 mins cure time. Same finish as Aluminium |
| Cardboard (2:1): | 4 coats, 3 mins. cure/coat produced a slight gloss. |
| Aluminium (2:1): | 1 coat, 10 min. cure produced an excellent glossy homogenous finish with excellent scratch resistance. |
| Copper (2:1): | 1 coat, 15 min cure. Same finish as aluminium. |
| Cardboard (1:2): | 3 coats, 3 mins. cure/coat produced a good but speckeldy gloss. |
| Aluminium (1:2): | 1 coat, 15 mins cure produced a very good gloss which is slightly speckeldy. Excellent scratch resistance. |
| Copper (1:2): | Same as Aluminium. |
| Solvent Resistance: | Poor solvent resistance of ratios 1:1, 2:1 and 1:2 to Acetone |

45. LINSEED OIL/STYRENE + 10% SARTOMER MONOMERS 444 PREPOLYMERS

-continued (1:1) On standing at 0° C a two phase system is evident. This consists of a yellow liquid and a white solid.
(2:1) On standing at 0° C a white opaque solid mass is evident.
(1:2) Same as (2:1) ratio.
Irradiation Times
(1:1) 10% Sartomer Monomers 444 added, 2 hours irradiation.
(2:1) "
(1:2) 10% Sartomer Monomers 444 added, 2 hours irradiation.

46. LINSEED OIL/METHYLSTYRENE
Mixtures of 1:1, 2:1 and 1:2 produces yellow very liquid one phase prepolymers.
Irradiation Time
1:1 24 hours, 1% Divinyl Benzene added, further 34 hours irradiaton = 58 hours.
2:1 24 hours, 1% Divinyl Benzene added, further 24½ hours irradiation = 48½ hours.
1:2 15½ hours, 1% Divinyl Benzene added, further 41½ hours irradiation = 57 hours
Solvent: Benzene
Cardboard (1:1): 3 coats, 3 mins cure/coat produced a non-gloss finish
Aluminium (1:1): 1st coat, 10 min cure, 2nd coat, 20 mins cure produced a glossy homogeneous finish with excellent scratch resistance.
Copper (1:1): Same as Aluminium
Cardboard (2:1): Same as 1:1
Aluminium (2:1): Same as 1:1 except 2nd coat cured in 30 mins.
Copper (2:1): 1 coat, 20 min cure produced a smooth glossy finish with excellent scratch resistance.
Cardboard (1:2): Same as (1:1) and (2:1).
Aluminium (1:2): Same as (1:1).
Copper (1:2): 1 coat, 15 mins. cure produced a smooth glossy finish with excellent scratch resistance.
Solvent Resistance: Poor solvent resistance to acetone. Coating at (2:1) better than (1:1), which is better than (1:2).

47. LINSEED OIL/BUTYL ACRYLATE
(1:1) Precipitate present which can be dissolved into liquid phase. A clear very liquid prepolymer.
(2:1) Same 1:1.
(1:2) Precipitate present which can be dissolved into liquid phase. A yellow very liquid prepolymer.
Irradiation Time
(1:1) 19 hours, 1% Divinyl Benzene added, further 12 hours irradiation = 31 hours.
(2:1) 15 hours, 1% Divinyl Benzene added, further 8 hours irradiaion = 23 hours.
(1:2) 15 hours, 1% Divinyl Benzene added, further 8 hours irradiation = 23 hours.
Solvent: Acetone
Cardboard (1:1): 2 coats, 1 min cure/coat produced a matt finish.
Aluminium and Copper (1:1): 1 coat, 20 mins cure produced a soft glossy homogeneous finish.
Cardboard (2:1): 2 coats, 1 min cure/coat produced a very slight gloss.
Aluminium (2:1): 1 coat, 10 min cure produced a hard glossy homogeneous finish.
Copper (2:1): 1 coat, 19 min. cure produced a soft glossy homogeneous finish.
Cardboard (1:2): 2 coats, 1½ min cure/coat produced a very slight gloss.
Aluminium (1:2): 1 coat, 4 min cure produced a glossy homogeneous finish with average scratch resistance.
Copper (1:2): Same as Aluminium, 10 min cure produced a soft finish
Solvent Resistance: Poor solvent resistance of coatings on Aluminium and Copper. Acetone has very little effect on coating on cardboard.

48. ALKYD RESIN/STYRENE
(1:1) White opaque very viscous one phase prepolymer
(2:1) Yellowish white opaque very viscous one phase prepolymer
(1:2) Yellowish liquid layer, white solid mass capable of dissolving in liquid layer.

Irradiation Times
(1:1) 48 hours, 1% Divinyl Benzene added, further 12 hours irradiation = 68 hours
(2:1) 38 hours, 1% Divinyl Benzene added, further 25 hours irradiaton = 73 hours.
(1:2) 42 hours, 1% Divinyl Benzene added, further 18 hours irradiation = 60 hours
Solvent: Acetone and Benzene
Cardboard (1:1): 1 coat, 2 min cure produced an excellent gloss.
Aluminium (1:1): 1 coat, 2 min cure produced a glossy homogeneous finish with excellent scratch resistance.
Copper (1:1): Same as Aluminium
Prepolymer does not completely dissolve in acetone
Cardboard (2:1): A white ppte. produced. 2 coats, 2 min cure/coat produced a glossy speckeldy finish with white spots of homopolymer.
Aluminium (2:1): 1 coat, 7 min cure produced a glossy homogeneous finish with excellent Sartomer monomers, but with white spots of homopolymer.
Copper (2:1):
Cardboard (1:2): 3 coats, 1 min cure/coat produced an average gloss.
Aluminium (1:2): 2 coats, 2 mins cure/coat produced a glossy homogeneous finish with excellent scratch resistance.
Copper (1:2): Same as Aluminium.
Solvent Resistance: Acetone - poor solvent resistance to acetone though 1:1 is marginally better than 1:2 on aluminium.
Benzene - Complete removal of gloss coating at ratios of 1:1 and 1:2.

49. ALKYD RESIN/METHYLSTYRENE
All mixtures 1:1, 2:1 and 1:2 produced yellow very liquid one phase systems.
Irradiation Time
(1:1) 61 hours, 1% Divinyl Benzene added, further 22 hours irradiation = 83 hours.
(2:1) 56 hours, 1% Divinyl Benzene added, further 25 hours irradiation = 81 hours.
(1:2) 60 hours, 1% Divinyl Benzene added, further 22 hours irradiaton = 82 hours.
Cardboard (1:1): 3 coats, 1 min cure/coat produced a poor gloss.
Aluminium (1:1): 1 coat, 2 min cure produced an excellent glossy homogeneous finish with excellent scratch resistance.
Copper (1:1): 1 coat, 3 min cure, produced a finish same as Aluminium.
Cardboard (2:1): 3 coats, 1 min cure/coat produced an excellent glossy finish.
Aluminium (2:1): 1 coat, 2 min cure/coat produced a glossy homogeneous finish with excellent scratch resistance.
Copper (2:1): 1 coat, 4 min cure. Same finish as Aluminium.
Cardboard (1:2): 2 coats, 1 min cure/coat produced no gloss.
Aluminium (1:2): Same as (1:1).
Copper (1:2): Same as (1:1).
Solvent Resistance : Poor solvent resistance to acetone for coatings on Aluminium and Copper. Complete removal of gloss coat at 1:1, 2:1 and 1:2.

50. ALKYD RESIN/BUTYL ACRYLATE + 1% SARTOMER MONOMERS 444
(1:1)
(2:1) } Yellow very viscous one phase prepolymers.
(1:2)
Irradiation Time (hours)
(1:1) 1% Divinyl Benzene added 5½ hours irradiation = 5½ hours
(2:1) 1% Divinyl Benzene added 8½ hours irradiation = 8½ hours
(1:2) 2¾ hours 1% Divinyl Benzene added 3 hours irradiation = 5¾ hours
Testing on Cardboard, Aluminium and Copper
BENZENE AS SOLVENT
Cardboard (1:1): 1st coat, 2 min cure, 2nd coat, 7 min cure, produced a good gloss.
Aluminium (1:1): 2 coats, 5 min cure/coat produced a smooth glossy finish which is soft.
Copper (1:1): 1 coat, 5 min cure produced a smooth glossy finish with excellent scratch resistance.

| | -continued |
|---|---|
| Solvent Resistance: | Poor solvent resistance to acetone for coatings at 1:1 and 1:2 on Copper and Alluminium though 2:1 is marginally better on Aluminium. |
| Cardboard (2:1): | 2 coats, 3 min cure/coat produced an excellent gloss. |
| Aluminium (2:1): | 1 coat, 10 min cure produced a smooth glossy finish with excellent scratch resistance. |
| Copper (2:1): | Same as Aluminium except 20 min cure. |
| Cardboard (1:2): | 3 coats 3 min cure/coat produced a very slight gloss. |
| Aluminium (1:2): | 2 coats, 10 min cure/coat produced a smooth glossy finish with excellent scratch resistance. |
| Copper (1:2): | Same as Aluminium except 20 min cure. |
| Solvent Resistance: | Complete gloss removal for ratios of 1:1, 2:1 and 1:2. |
| (1:1)<br>(2:1)<br>(1:2) | Yellow very viscous phase prepolymers. |

| Prepolymer Irradiation Time (hours) | Results for 1% Divinyl Benzene |
|---|---|
| (1:1) 1% Sartomer Monomers 444, then 6 hrs irradiation | 5½ |
| (2:1) 1% Sartomer Monomers 444, then 8 hrs irradiation | 8½ |
| (1:2) 1% Sartomer Monomers 444, then 3½ hrs irradiaion | 5¾ |

| Testing on Cardboard, Aluminium and Copper | |
|---|---|
| Cardboard (1:1): | Not fully tested due to difficulty in dissolving prepolymer because of its high degree of polymerisation. |
| Aluminium (1:1): | 1 coat, 10 min cure, 2nd coat, 15 min cure produced an excellent glossy finish with good scratch resistance. |
| Copper (1:1): | Same as Aluminium. |
| Cardboard (2:1): | 3 coats, 3 mins cure/coat produced a very good gloss which was slighly inhomogeneous. |
| Aluminium (2:1): | 1 coat, 15 min cure produced a glossy finish with good scratch resistance. |
| Copper (2:1): | Same as Aluminium. |
| Cardboard (1:2): | 3 coats, 3 mins cure/coat produced no gloss. |
| Aluminium (1:2): | 1 coat 25 min cure produced a smooth matt finish with good scratch resistance. |
| Copper (1:2): | 1 coat, 25 min cure, produced a smooth glossy finish with average scratch resistance. |
| Solvent Resistance: | Pour solvent resistance to Acetone though better than other prepolymers tested. Possibly due to high molecular weight. |

51. GUM ROSIN/STYRENE (1:1) Yellow prepolymer with solid matter in liquid phase.
(2:1) Yellow prepolymer with more solid matter than 1:1 in the solid phase.
(1:2) Clear one phase prepolymer.

Irradiation Times (hours)
(1:1) 1% Divinyl Benzene added 73½ hours irradiation
(2:1) 1% Divinyl Benzene added 29½ hours irradiation
(1:2) 1% Divinyl Benzene added 41 hours irradiation

| Cardboard (1:1): | 3 coats, 1 min cure/coat produced a glossy finish. |
|---|---|
| Aluminium (1:1): | 1 coat, 2 min cure, produced an excellent glossy finish with very good scratch resistance. |
| Copper (1:1): | 1 coat, 3 min cure, same finish as Aluminium. |
| Benzene as Solvent | |
| Cardboard (2:1): | 4 coats, 3 min cure/coat produced a slight gloss. |
| Aluminium (2:1): | 1 coat, 5 min cure, produced an excellent glossy finish with excellent scratch resistance. |
| Copper (2:1): | 1 coat, 6 min cure, same finish as Aluminium. |
| Benzene<br>Cardboard (1:2): | 2 coats, 1 min cure/coat produced a glossy finish. |
| Aluminium (1:2): | 1 coat, 2 min cure, better finish than (1:1) but only very good scratch resistance. |
| Copper (1:2):<br>Benzene | 1 coat, 3 min cure, same as Aluminium. |
| Solvent Resistance: | Pour solvent resistance to acetone for coatings on Aluminium and Copper 1:1 and 1:2 |

| | -continued |
|---|---|
| | Complete removal of gloss coat at 1:1 and 1:2 |
| (1:1.5) | Clear yellow liquid prepolymer |
| (1:10) | Clear slightly yellow slightly opaque liquid prepolymer. |

Irradiation Times (hours)
(1:1.5) 1% Divinyl Benzene added, 48 hours irradiation.
(1:10) 1% Divinyl Benzene added, 44½ hours irradiation.

52. GUM ROSIN/α METHYL STYRENE (1:1) Yellow very liquid one phase prepolymer
(2:1) yellow opaque solid mass.
(1:2) Yellow very liquid one phase prepolymer Irradiation Times
(1:1) 24 hours, 1% Divinyl Benzene added further 34 hrs. = 58 hrs
(2:1) 9 hours, 1% Divinyl Benzene added further 15 hrs. = 24 hrs
(1:2) 15¼ hrs. 1% Divinyl Benzene added further
41½ hrs. = 57½ hrs Testing on Cardboard, Aluminium and Copper
Benzene as Solvent

| Cardboard (1:1): | 3 coats, 1 min cure/coat produced a non-gloss finish. |
|---|---|
| Aluminium (1:1): | 1st coat 6 min cure, 2nd coat 8 min cure produced a glossy yellow finish which was soft. |
| Copper (1:1): | 1st coat 23 min cure, 2nd coat 23 min cure produced a glossy yellow finish which was soft. |
| Cardboard (2:1): | 3 coats 2 min cure/coat produced a non-gloss finish. |
| Aluminium (2:1): | 1 coat, 30 min cure produced a glossy yellow finish which was soft. |
| Copper (2:1): | Same as Aluminium. |
| Cardboard (1:2): | Same as (2:1). |
| Aluminium (1:2): | 1st coat 15 min cure, 2nd coat 30 min cure, produced a smooth glossy, finish with poor scratch resistance. |
| Copper (1:2): | Same as Aluminium. |
| Solvent Resistance: | Poor solvent resistance to acetone for coatings on Aluminium and Copper at 1:1, 2:1, and 1:2. Complete gloss removal at ratios of 2:1 and 1:2 wetting of cardboard covers at (1:2) ratio. |

53. GUM ROSIN/BUTYL ACRYLATE (1:1) Two phase system small amount of dark yellow.
(2:1) Liquid and large amount of solid matter.
(1:2) Clear yellow viscous liquid.

Irradiation Times
(1:1) 15¼ hrs irradiation, 1% Divinyl Benzene added further 20 hrs = 35¼ hrs.
(2:1) 15¼ hrs irradiation, 1% Divinyl Benzene added further 20 hrs = 35¼ hrs.
(1:2) 1% Divinyl Benzene added, 30 hrs irradiation.

Testing on Cardboard, Aluminium and Copper

| Cardboard (1:1): | 3 coats, 1 min cure/coat produced very little gloss. |
|---|---|
| Aluminium (1:1): | 1 coat, 1 min cure, produced a glossy yellow homogeneous finish with excellent scratch resistance. |
| Copper (1:1): | 1 coat, 2 min cure, produced a glossy yellow homogeneous finish with very good scratch resistance. |
| Benzene as Solvent | |
| Cardboard (2:1): | 3 coats, 1 min cure/coat produced an excellent gloss. |
| Aluminium (2:1): | 1 coat, 1½ min cure, glossy homogeneous finish with excellent scratch resistance. |
| Copper (2:1): | 1 coat, 3 min cure, glossy homogeneous finish with excellent scratch resistance. |
| Cardboard (1:2): | 2 coats, 2 min cure/coat produced a poor gloss. |
| Aluminium (1:2): | 1 coat, 1 min cure produced a glossy homogeneous finish with good scratch resistance. |
| Copper (1:2): | 1 coat, 3 min cure produced a glossy homogeneous finish with average scratch resistance. |
| Solvent Resistance: | Poor solvent resistance to acetone for coating on Aluminium and Copper at 1:1 |

-continued

2:1 and 1:2 Complete removal of gloss coat from cardboard at 1:1 2:1 and 1:2.

54. GUM ROSIN/BUTYL ACRYLATE
(1:10) Ratio A clear yellow liquid prepolymer.
Irradiation Time
1% Divinyl Benzene added, 13¾ hours irradiation.
Cardboard: 3 coats, 2 min cure/coat produced no gloss.
Aluminium: 1 coat, 5 min cure produced an excellent glossy finish with excellent scratch resistance.
Copper: 1 coat, 8 min cure produced the same finish as Aluminium.
Solvent Resistance to Acetone: NIL
(1:1.5) Ratio. A clear dark yellow liquid prepolymer.

Irradiation Time.

1% Divinyl Benzene added, 39¼ hours irradiation.

55. The following example shows the use of a printing ink based on a prepolymer according to this invention;

64% by weight of a prepolymer formed from a 1:1 mixture of acrylanitrile and methyl methacrylate by U.V. initiation was mixed with;
14% by weight trimethylal propane triacrylate
6% by weight benzaphenone
2% by weight michelers ketone
14% by weight phthalocyanine blue.

The ink was printed onto paper and cured by one pass at the rate of 85 feet/minute beneath a 200 w/inch U.V. lamp at a distance of 7 cm from the paper. The ink cured to a hard dry coating.

The following examples show the advantages accruing from the use of U.V. initiation as against thermal initiation. The U.V. initiation preferably takes place at an elevated temperature to give short prepolymerisation times, and clear viscous prepolymers which are relatively light in colour.

56. GUM ROSIN/STYRENE (1:1)
(a) Thermal at 110° C produces in 15½ hours a clear liquid prepolymer which was much darker than that produced by (b).
(b) U.V. and Thermal at 110° C produces in 16 hours a prepolymer of extremely high viscosity and clarity. The prepolymers produced by processes (a) and (b) were coated onto Copper and cured using U.V. radiation. Prepolymer (a) cured in 5 minutes while prepolymer (b) cured in 2 minutes using an identical U.V. source.

57. STYRENE a. U.V. at 25° C produces in 13 hours a slightly viscous clear one phase prepolymer.
b. Thermal at 110° C produces in 2 hours a clear one phase very viscous prepolymer.
c. Thermal and U.V. at 110° C produces in 1¼ hours a clear very viscous prepolymer.

58. STYRENE/BUTYL ACRYLATE (1:1)

a. Thermal at 110° C produces in 2½ hours a clear very viscous prepolymer.
b. Thermal and U.V. at 110° C produces in 1¼ hours a clear very viscous prepolymer.

59. LINSEED OIL/γ-METHYL STYRENE (1:1)

a. Thermal at 110° C produces in 12½ hours a yellow slightly viscous one phase prepolymer
b. Thermal and U.V. at 110° C produces in 13 hours a yellow viscous prepolymer.

60. LINSEED OIL/BUTYL ACRYLATE (1:1)

a. Thermal at 110° C produces in 10¼ hours a clear yellow slightly viscous prepolymer.
b. Thermal and U.V. at 110° C produces in 10¼ hours a clear yellow very viscous prepolymer.

61. GUM ROSIN/STYRENE (1:1)

a. Thermal at 110° C produces in 15½ hours a slightly viscous dark brown one phase prepolymer.
b. Thermal and U.V. at 110° C produces in 16 hours a light brown one phase very viscous prepolymer.

62. METHYL METHACRYLATE/ACRYLONITRILE (1:1)

a. U.V. at 25° C produces in 4½ hours a slightly yellow slightly opaque one phase viscous prepolymer
b. Thermal at 60° C produces in 40 hours a clear yellow one phase viscous prepolymer
c. Thermal and U.V. at 60° C produces in 2¼ hours a clear yellow one phase viscous prepolymer.

63. METHYL METHACRYLATE/BUTYL ACRYLATE (1:1)

a. U.V. at 25° C produces in 2¾ hours a clear very viscous prepolymer.
b. Thermal at 80° C produces in 5 hours a slightly yellow viscous one phase prepolymer
c. U.V. and Thermal at 80° C produces in 1½ hours a clear viscous one phase prepolymer.

In addition to the monomers referred to above the following monomers have been found to be useful in the present invention;

Allyl Acrylate
Allylamine
Acrolein
Allyl Isophthalyl Cyanate
Cyclo - hexene
Bis Phenol A Bis 2 Hydroxy Propyl Methacrylate
Ethoxylated Bis Phenol A Diacrylate/Ethoxylated Bis
Phenol A Demethacrylate/Diallyl Fumorate
Cyclo Hexyl Methacrylate
Halogenated Olefines such as 2, 3 Dichloro 1, 3 Butadiene
2 Ethyl Hexyl Acrylate
1, 6 Hexane Diol Diacrylate
Hydroxy Ethyl Acrylate
Hydroxy Ethyl Methacrylate
Diethyleneglycol Diacrylate
Diethylene Glycol Dimethacrylate
Dimethyl Amino Ethyl Acrylate
Dimethyl Amino Ethyl Methacrylate
Isapropenyl Acetate
Cetyl Vinyl Ether
Dodecyl Vinyl Ether
Methylene Bis Acrylamide
Maleice Anlhydrid
N-Methylol Acrylamide
Methacrylic Acid
Neo Pentyl Glycol Diacrylate
Pentaerythritol Triacrylate Pentacrythritol Tetracrylate
Trimethylol Propane Triacrylate
Halogenated Styrenes
Glycidyl Methacrylate The following example illustrates the use of an electron beam to cure a prepolymer according to the present invention.

64. A 1:1 acrylonitrile/styrene prepolymer prepared using γ-rays initiation was coated onto a clear copper shut. The coating was subjected to six passes beneath a 400,000 e.V. electron beam under a nitrogen atmosphere. A hard, clear, scratch resistant film was produced.

We claim:

1. A process for the preparation of a prepolymer capable of being cured by ultra-violet or ionising radiation, comprising the steps of subjecting a mixture of a polymerizable ethylenically unsaturated monomer or a mixture of such monomers and a polymer selected from the group consisting of polyamides, polyesters including alkyl resins, polycarbonates, epoxy resins, polyvinylalcohols, polyvinylchlorides, polysilanes and polysiloxanes, to ultra-violet or ionising radiation, until a predetermined but incomplete degree of polymerisation is achieved; and removing the prepolymer so formed from the radiation.

2. A process as claimed in claim 1 in which the ethylenically unsaturated monomer or monomers, include a vinyl or vinylidene group.

3. A process as claimed in claim 2 in which the monomer or mixture of monomers is selected from the group consisting of styrene, vinyl chloride/ethyl acrylate blend, and vinyl chloride/methyl acrylate blend.

4. A process as claimed in claim 2 in which the monomer or mixture of monomers is selected from the group consisting of styrene, butyl acrylate, methyl methacrylate, vinylidene chloride, ethyl acrylate, acrylonitrile, vinyl acetate and mixtures thereof.

5. A process as claimed in claim 2 in which the monomer or monomers is selected from the group consisting of acrylic acid/allyl acrylate blends.

6. A process as claimed in claim 2 in which the monomer or monomers is selected from the group consisting of methyl methacrylate/acrylonitrile blends and methyl methacrylate/vinyl acetate blends.

7. A process as claimed in claim 2 in which the monomer or monomers selected from the group consisting of blends of butyl acrylate with methyl methacrylate, methyl methacrylate with vinyl acetate and ter-polymers of isoprene/styrene/acrylonitrile.

8. A process as claimed in claim 1 in which the prepolymer is formed by U.V. irradiation.

9. A process as claimed in claim 1 in which the prepolymer is formed by γ-irradiation.

10. A process as claimed in claim 1 comprising the additional steps of applying the prepolymer thus formed to a substrate and curing the prepolymer thereon by subjecting it to ultra-violet or ionising radiation.

11. A process as claimed in claim 10 wherein the prepolymer is cured by ultra-violet radiation.

12. A process as claimed in claim 10 wherein the prepolymer is cured by electron beam irradiation.

* * * * *